(12) United States Patent
Beckmann et al.

(10) Patent No.: US 8,458,489 B2
(45) Date of Patent: Jun. 4, 2013

(54) DIFFERENTIAL UNCLONEABLE VARIABILITY-BASED CRYPTOGRAPHY

(75) Inventors: Nathan Beckmann, Cambridge, MA (US); Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 389 days.

(21) Appl. No.: 12/732,012

(22) Filed: Mar. 25, 2010

(65) Prior Publication Data

US 2011/0239002 A1 Sep. 29, 2011

(51) Int. Cl.
*G06F 12/14* (2006.01)

(52) U.S. Cl.
USPC .......................................... 713/189

(58) Field of Classification Search
None
See application file for complete search history.

(56) References Cited

U.S. PATENT DOCUMENTS

| | | | | |
|---|---|---|---|---|
| 2003/0204743 | A1* | 10/2003 | Devadas et al. | 713/200 |
| 2008/0279373 | A1 | 11/2008 | Erhart et al. | |
| 2009/0083833 | A1* | 3/2009 | Ziola et al. | 726/2 |

OTHER PUBLICATIONS

Ravikanth Pappu, et al "Physical One-Way Functions" Science 297, 2026-2030 (2002) [Online: http://www.sciencemag.org/cgi/content/full/297/5589/2026].

Alfred J. Menezes, et al "Handbook of Applied Cryptography" CRC Press, ISBN: 0-8493-8523-7, 5th Printing Aug. 2001, Chapter 1 (pp. 1-48) and Chapter 12 (pp. 489-541) [Online: http://www.cacr.math.uwaterloo.ca/hac/].

Bernstein, K. et al., "High-Performance cmos variability in the 65—nm regime and beyond," IBM Journal of Research and Development, vol. 50 No. 4/5, pp. 433-449, Jul./Sep. 2006.

Corkum, P. and Krausz, F., "Attosecond Science," Nature Physics, 3 (6), pp. 381-387, 2007.

Roy, S. and Asenov, A., "Where do the dopants go?" Science, vol. 309 No. 5733, pp. 388-390, Jul. 15, 2005.

John D. Joannapoulou et al. "Photonic Crystals: Molding the Flow of Light," Princeton University Press, 2nd Edition, 2008, pp. 252-264.

Kleinberg, J. and Tardos, E., "Algorithm Design," pp. 1-8, Addison-Wesley Longman Publishing Co., Inc., 2005.

Goldreich, O., "Foundations of Cryptography," vol. 1, Cambridge University Press, 2001, pp. 1-3.

Verayo, "Vera X512H unclonable RFID IC" [Online: http://www.verayo.com].

A. Baltuska, et al "Attosecond control of electronic processes by intense light fields" Letter to Nature, vol. 42, Feb. 6, 2003, pp. 611-615.

Eli Biham, et al "Differential Cryptanalysis of DES-like Crypotosystems" Journal of Cryptology, 4(1):3-72, 1991.

Yugun Chen, et al "Certifying Authenticity via Fiber-Infused Paper" ACM SIGecom Exchanges, 5(3):29-37, 2005.

(Continued)

*Primary Examiner* — Cordelia Zecher
(74) *Attorney, Agent, or Firm* — Maschoff Brennan

(57) ABSTRACT

Differential uncloneable variability-based cryptography techniques are provided. The differential cryptography includes a hardware based public physically uncloneable function (PPUF) to perform the cryptography. The PPUF includes a first physically uncloneable function (PUF) and a second physically uncloneable function. An arbiter determines the output of the circuit using the outputs of the first and second PUFs. Cryptography can be performed by simulating the PPUF with selected input. The output of the simulation, along with timing information about a set of inputs from where the corresponding input is randomly selected for simulation, is used by the communicating party that has the integrated circuit with the PPUF to search for an input that produces the output. The input can be configured to be the secret key or a part of the secret key.

22 Claims, 9 Drawing Sheets

OTHER PUBLICATIONS

M. Hentschel, et al "Attosecond metrology" Nature, vol. 414, Nov. 29, 2001, pp. 509-513.

Foad Dabiri, et al "Hardware Aging-Based Software Metering" The Design, Automation and Test in Europe, 2009.

Whitfield Diffie, et al "New Directions in Cryptography" IEEE Transactions on Information Theory, IT-22:644-654, Nov. 1976.

Paul Friedberg, et al "Modeling Within-Die Spatial Correlation Effects for Process-Design Co-Optimization" Proceedings of the Sixth International Symposium on Quality Electronic Design (ISQED'05), 516-521, 2005.

Blaise Gassend, et al "Silicon Physical Random Functions" Proceedings of the 9th ACM conference on Computer and communications security, pp. 148-160, 2002.

E. Goulielmakis, et al "Attosecond control and Measurement: Lightwave Electronics" Science 317, Aug. 10, 2007, 769-775.

E. Gustafsson, et al "Broadband attosecond pulse shaping" Optics Letters, vol. 32, No. 11, Jun. 1, 2007 pp. 1353-1355.

Science Portal "In 2008 the number of personal computers in the world will reach billiaon" [online: http://www.science-portal.org/in/71] Accessed Feb. 15, 2009.

Jozef Kalisz "Review of methods for tiem interval measurements with picosecond resolution" Metrologia, 41 (2004) 17-32.

Paul Kocher, et al "Differential Power Analysis" Advances in Cryptology, Lecture Notes in Computer Science, 1109:104-113, 1996.

Farinaz Koushanfar, et al "Post-Silicon Timing Characterization by Compressed Sensing" IEEE/ACM International Conference on Computer-Aided Design pp. 185-189, 2008.

Farinaz Koushanfar, et al "Intellectual Property Metering" Workshop on Information Hiding (IHW), vol. 2137, pp. 87-102, Spinger-Werlag, Apr. 2001.

Keith Lofstrom, et al "IC Identification Circuit Using Device Mismatch" IEEE International Solid State Circuyits Conference, pp. 372-373, 2000.

Mehrdad Majzoobi, et al "Lightweight Secure PUFs" IEEE/ACM International Conference on Computer Aided Design, 2008.

Mehrdad Majzoobi, ET "Testing techinques for hardware security" IEEE International Test Conference, 2008.

Steven M. Martin, et al "Combined Dynamic Voltage Scaling and Adaptive Body Biasing for Lower Power Microprocessors under Dynamic Workloads" IEEE/ACM International Conference on Computer Aided Design, pp. 721-725, Nov. 10-14, 2002.

A. Mysyrowicz, et al "Self-compression of optical laser pulses by filamentation" New Journal of Physics, 10 (2008) pp. 1-14.

Ekmet Ozbay "Plasmonics: Merging Photonics and Electronics at Nanoscale Dimensions"Science, vol. 311, Jan. 13, 2006, pp. 189-193.

R. L. Rivest, et al "A Method for Obtaining Digital Signatures and Public-Key Cryptosystems" Communications of the ACM, 21(2):120-126, 1978.

Davood Shamsi, et al "Noninvasive Leakage Power Tomography of Integrated Circuits by Compressive Sensing" International Symposium on Low Power Electronics and Design, pp. 341-346, 2008.

Sergei P. Skorobogatov, et al "Optical Fault Induction Attacks" International Workshop on Cryptographic Hardware and Embedded Systems, pp. 2-12, 2003.

Scott Thompson, et al "MOS Scaling: Transistor Challenges for the $21^{st}$ Century" Intel Technology Journal, Q3, pp. 1-19, 1998.

Farinaz Koushanfar, et al "CAD-based Security, Cryptography, and Digital Rights Management" [online:http://www2.dac.com/data2/44th/44acceptedpapers.nsf/0c4c09c6ffa905c487256b7b007afb72/5071f9fd033757a5872572a0004726b1/$FILE/15_4.PDF].

Yousra Alkabani, et al "Trusted Integrated Circuites: A Nondestructive Hidden Characteristics Extraction Approach" III 2008, LNCS 5284, pp. 102-117, 2008 [online: http://users.crhc.illinois.edu/kiyavash/papers/ihw08.pdf].

Yousra Alkabani, et al "Remove Activation of Ics for Piracy prevention and Digital Right Management" [online: http://www2.iccad.com/data2/iccad/iccad_07acceptedpapers.nsf/9cfb1ebaaf59043587256a6a00031f78/50fd5421476593a6872573b70076fb5a/$FILE/9D_3.PDF].

Nathan Beckmann, et al "Hardware-Based Public-Key Cryptography with Public Physically Unclonable Functions" Book, Lecture Notes in Computer Science: Information Hiding, Sep. 3, 2009, pp. 206-220, vol. 5806/2009, Springer, Berlin / Heidelberg.

* cited by examiner

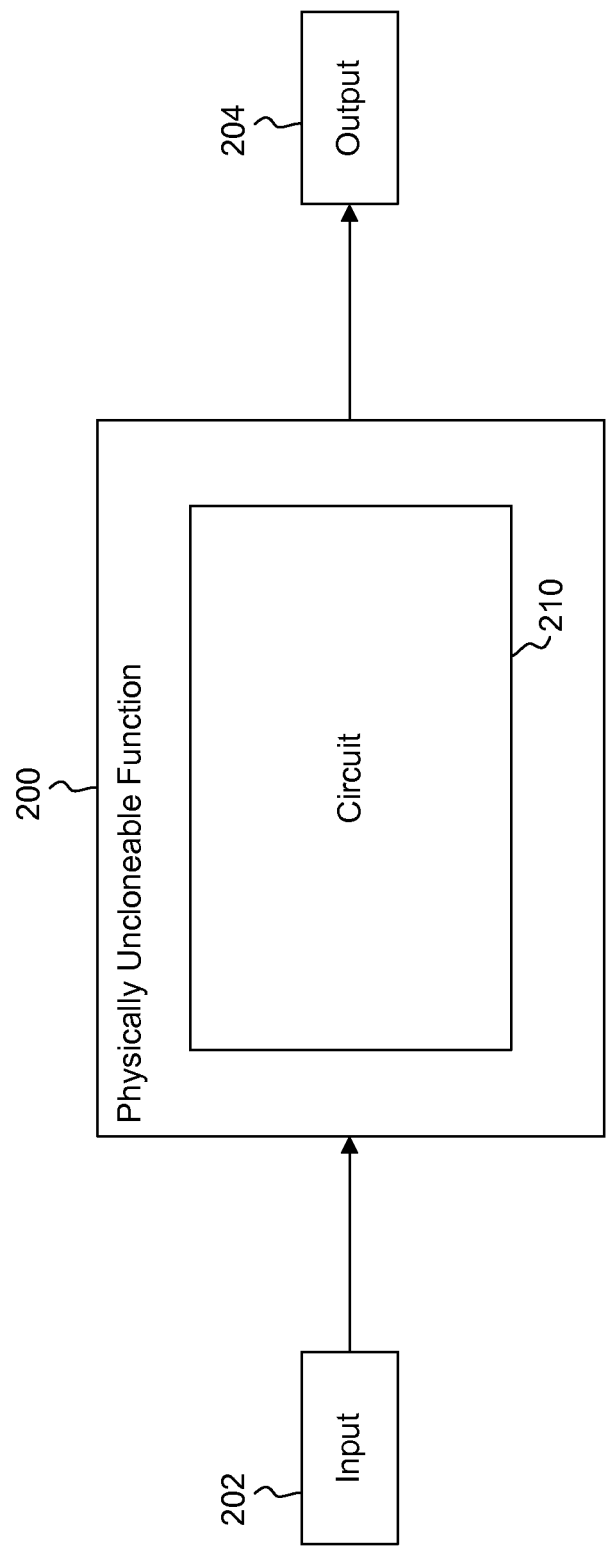

DIFFERENTIAL UNCLONEABLE VARIABILITY-BASED CRYPTOGRAPHY

BACKGROUND

Cryptography can be generally described as a scientific and engineering field that develops and analyzes techniques for protecting the privacy of stored or communicated data. Because the protection of data is a top concern in many applications, cryptography is employed to protect the data in many applications. For example, mobile, sensing, health, financial, e-commerce and other applications have elevated the importance of cryptography in protecting data.

Currently, cryptography is mainly performed using secret key (e.g., symmetric key, shared key, private key, and one key) and public key techniques. Cryptographic techniques, and in particular public key protocols, have been the basis for numerous security applications, ranging from secure email, secure remote access (e.g., passwords and smart cards), remote gambling, and digital signatures to privacy protection, digital rights management, watermarking and fingerprinting.

However, conventional cryptographic techniques have several drawbacks. First, the current state-of-the-art cryptographic techniques are based on extremely likely but nevertheless unproven mathematical assumptions. Second, even if there are no algorithmic weaknesses in public key cryptographical protocols, they can often be broken due to software vulnerabilities, physical attacks, or side channels.

SUMMARY

In some embodiments, differential uncloneable variability-based cryptography techniques are provided. Differential cryptography may employ a hardware based public physically uncloneable function (PPUF) to perform the cryptography. The PPUF may include a first physically uncloneable function (PUF) and a second PUF. An arbiter may determine the output of the circuit using the outputs of the first and second PUFS. Cryptography may be performed by simulating the PPUF with selected input. The output of the simulation, along with timing information about a set of inputs from where the corresponding input is randomly selected for simulation, may be used by the communicating party that has the integrated circuit with the PPUF to search for an input that produces the output. The input may be configured to be the secret key or a part of the secret key

DETAILED DESCRIPTION

Figure 1:
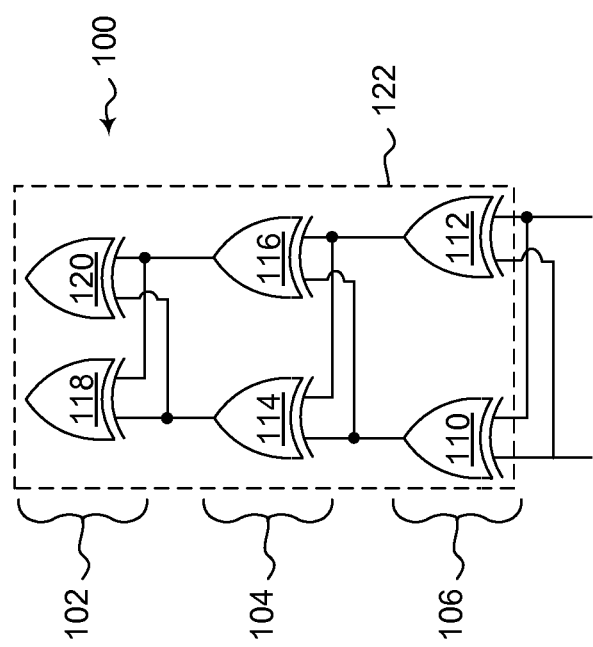
FIG. 1 shows a diagram of an illustrative embodiment of a public physically uncloneable function (PPUF).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments relate to cryptography using physically uncloneable functions (PUFs) and/or public physically uncloneable functions (PPUFs). A PUF can be a multiple-input, multiple-output, large entropy physical system that is unreproducible due to its structural complexity. A PUF can be a physical system (such as a circuit) that is intractably complex to replicate. Integrated circuit technologies may serve as PUFs due to their intrinsic manufacturing variability. An array of logical gates, for example, may be included in the circuitry of a PUF.

A public physically uncloneable function (PPUF) is a PUF that is created so that its simulation is feasible but requires a very large amount of time to compute even when ample computational resources are available. PPUFs form a class of PUFs that can be reverse engineered. Once the structure of a PPUF is completely characterized, a very large amount of time is required to compute the PPUF outputs for a given input. Using PPUFs, secret key exchange and public key protocols are resilient at least against physical and side channel attacks.

Embodiments of the cryptographical approach disclosed herein are based on a PPUF. In one example, the PPUF can be employed as a public key while the actual PPUF can function as a private key. The following example illustrates the operation of the PPUF and how the PPUF can be used in a cryptographic protocol.

FIG. 1 shows a diagram of an illustrative embodiment of a PUF that can be included in a PPUF that can be used for cryptography. Embodiments of the PPUF may include multiple PUFs as well as circuitry to determine an output of the PPUF from the outputs of the multiple PUFs.

As depicted, a PUF 100 includes an array of XOR gates 110, 112, 114, 116, 118, and 120 (collectively gates 122) that are arranged in rows 102, 104, and 106. The delay through each of the gates 110, 112, 114, 116, 118, and 120 is provided in the following table, in picoseconds (ps).

TABLE 1

|  | Input 1 | Input 2 |  | Input 1 | Input 2 |
| --- | --- | --- | --- | --- | --- |
| Gate 118 | .86 | .95 | Gate 120 | 1.24 | .96 |
| Gate 114 | 1.11 | .90 | Gate 116 | .78 | .71 |
| Gate 110 | .93 | 1.01 | Gate 112 | 1.12 | .88 |

Due to manufacturing variability, the delays are unequal for each gate and each input of each gate. In this example, 01 is initially on the input and the PUF 100 has reached a steady state output of 00 on gates 118 and 120. At time t=0, the input to the PUF 100 becomes 10. At t=0.88 ps, the 0 reaches the output of gate 112, which becomes 0. At t=1.12 ps, the 1 reaches the output of gate 112, and its output becomes 1. Similarly, at t=0.93 ps and t=1.01 ps, the gate 110 transitions to 0 and then to 1.

This pattern of output transitions repeats on the gates 122 through each row of the PUF 100. On row 104 for example, the gate 114 transitions each time a new input arrives. With reference to Table 1, this occurs at the transitions of the gate 110 plus 1.11 ps and the transitions of the gate 112 plus 0.90 ps. The gate 114 transitions at times t (2.04, 2.12, 2.02, 1.78 ps). Similarly, the output of the gate 116 transitions whenever the gates 110 or 112 transition, plus the delay through the gate 116. The gate 116 transitions at times t (1.71, 1.79, 1.83, 1.59 ps). Similarly, on the row 102, the gates 118 and 120 will each transition 8 times, when either the gate 114 or the gate 116 transitions (plus the delay through the gate). This gives rise to an exponential number of transitions on the number of rows in the PUF 100. As the size of the array increases, the simulation time increases accordingly.

The following discussion illustrates how to exchange a secret key between two parties, Alice and Bob. In this example, Alice possesses the PUF 100. A gate-level characterization of the PUF 100 is provided above in Table 1. Thus, the gate-level characterization can be viewed as a public key, which enables accurate simulation of the PUF 100. In one example, the gate-level characterization characterizes each gate of an integrated circuit in terms of its physical properties (e.g., gate width, gate length, thickness of oxide) and/or its manifestation properties (e.g., delay, leakage power, switching power). In Table 1, the PUF 100 is characterized in terms of delay.

To exchange the secret key, Bob selects an input. Bob chooses, for instance, $x_0$=01 and $x_1$=10. Bob also chooses a time, for instance t=2.7 ps. Generally, the time selected by Bob is before the PUF 100 reaches steady state. Bob then simulates the PUF 100 using the gate-level characterization of the PUF 100 starting at steady state on input $x_0$ with input $x_1$ arriving at time 0. Bob attempts to determine the output of the PUF 100 after 2.7 ps. To do so, BOB computes all 16 output transitions and concludes that the output of the PPUF reads y=10 at 2.7 ps.

Bob then sends $x_0$, t, and y to Alice. Alice has possession of the PUF 100 and uses the information from Bob ($x_0$, t, and y) to find the input $x_1$. To do so, Alice iterates over all possible inputs and checks the output of the PUF 100 for each input, clocking the output at t=2.7 ps. In this instance, $x_1$=10 is the only input that produces output y after 2.7 ps. In this case, the PUF 100 becomes the private key and enables Alice to quickly find $x_1$. In other words, Alice can search for the input that produces the output y using the PUF 100. The input can be the secret key.

The PUF 100 runs in a matter of picoseconds and searching the entire input space requires little time. As a result, Alice can use the information provided by Bob to quickly ascertain the input $x_1$ by searching the input space to identify the input $x_1$ when the output of the PUF 100 is y=10 at t=2.7 ps.

An attacker, on the other hand, must simulate every possible input until $x_1$ is found. The process of simulating the input requires substantially more processing power compared to Alice, who can search for the input $x_1$ using the actual PUF 100. The attacker is therefore at a disadvantage over Alice of simulating the PUF 100 instead of running the PUF 100. The attacker is also at a disadvantage to Bob because the attacker must simulate many inputs while Bob only simulates a single input. Expanding on these two advantages, an insurmountable advantage over an attacker can be achieved.

As described in more detail below, a PPUF can be formed using one or more PUFs. Outputs of the PUFs are arbitrated to determine the output of the PPUF. Arbitrating the outputs of the PUFs can eliminate timing issues that are associated with PUFs. For example, determining the output of a single PUF requires relatively precise clocking and timing. More specifically, the fast operation of the PUF, combined with the number of output transitions, results in an increased number of output transitions. In this case, the mean time between output transitions becomes extremely small. As a result, the ability to determine the output of the single PUF at a specific time requires relatively precise timing. The PPUF can arbitrate between the outputs of multiple PUFs, which reduces the timing and clocking requirements as described in more detail herein.

In the PPUF, the process of simulating the input requires a substantial amount of processing power. The time required to simulate the input is one factor that enables the PPUF to function as a public key in public key cryptography. Because the attacker is simulating the PPUF to find the input, the attacker is required to search the entire range of inputs. The time required to search the input space can become very large. Depending on the configuration of the PPUF, the time required to search the input space can be hundreds of years. In fact, the time required to simulate the input increases exponentially as the dimensions of the PPUF grow.

Further, the gates that make up the PPUF experience many transitions at each gate before reaching steady state in part because of the delay characteristics of the PPUF. As illustrated above, simulating all of these delays requires substantial time, especially as the dimensions of the PPUF increase. Because the output of the PPUF is generally measured at some time before the PPUF reaches steady state, the simulation cost is very large and simulation can require years.

The PPUF can thus be effectively used in cryptography, including public key cryptography. A possessor of the PPUF, for instance, can make the public description of the PPUF publicly available, for example, by depositing the description of the PPUF (e.g., a gate-level characterization) with an appropriate entity.

The following examples illustrate public key cryptography using the PPUF. The PPUF can be used to securely deliver media such as a digital movie. In this case, a purchaser that desires to purchase (rent, etc.) the movie may select an input (which may include more than one number in a range of numbers). The purchaser simulates the input using the publicly available description of the PPUF to determine the output of the PPUF at a time. As described previously, the purchaser then transmits the output and the time at which the output of the PPUF was clocked to a distributor or other entity that is delivering the movie to the person.

Because the distributor possesses the PPUF, which is the private key, the movie distributor can quickly search the input space using the output and the time received from the purchaser. Once the input is found, the distributor can deliver the movie using the input selected by the purchaser to encode the movie. The purchaser that requested the movie knows the input and will be able to decode the movie. An attacker, in contrast, would have to simulate the input space to find the input, a process that can take a very long time as disclosed herein.

In another example, the input selected by a user may be a message that has been binary encoded. This input can be simulated using the public description of the PPUF. The possessor of the PPUF similarly uses the output of the simulation and the time at which the output was clocked to search the PPUF. The message is thus determined when the input is found. As previously stated, searching for the input with the actual PPUF can be performed quickly.

Figure 2:
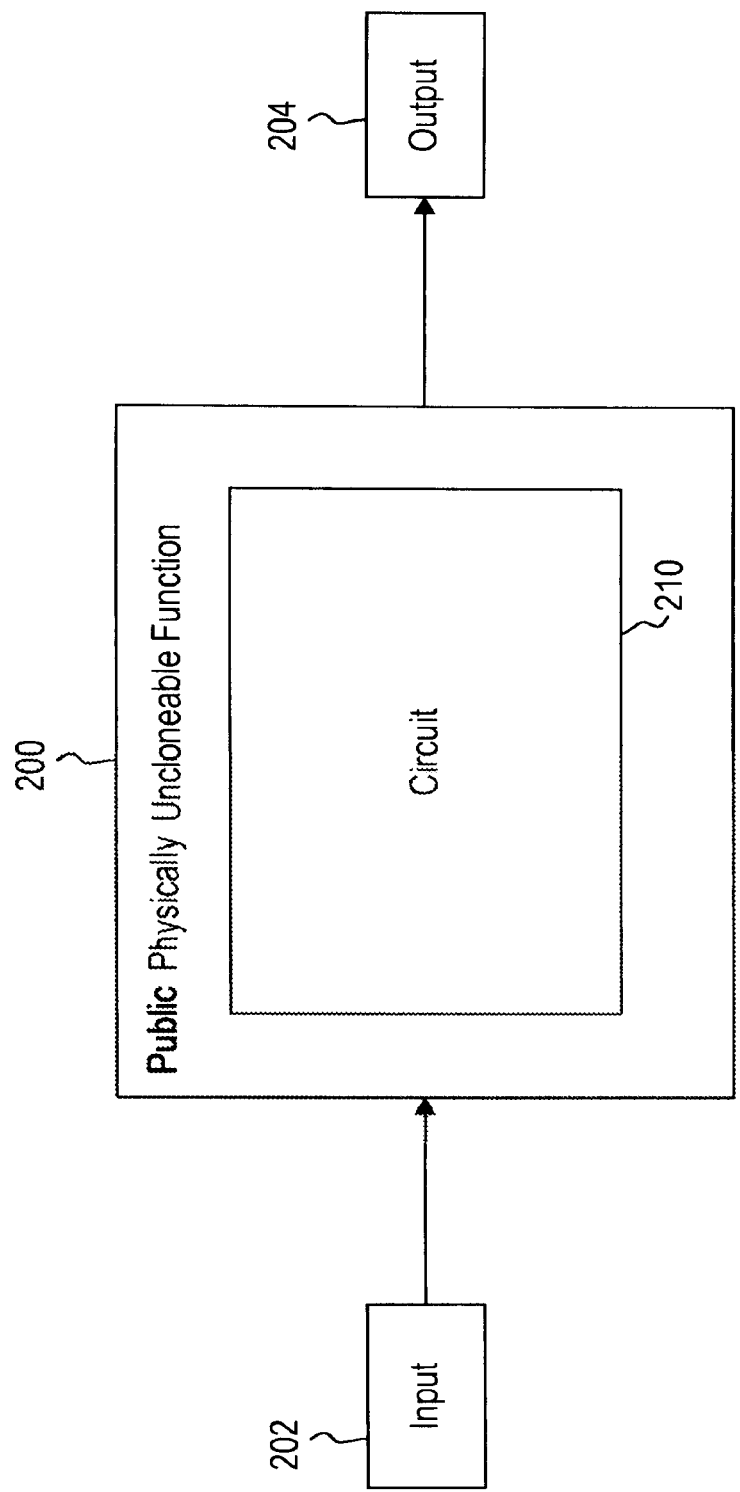
FIG. 2 shows a diagram of an illustrative embodiment of a PPUF.
Figure 9:
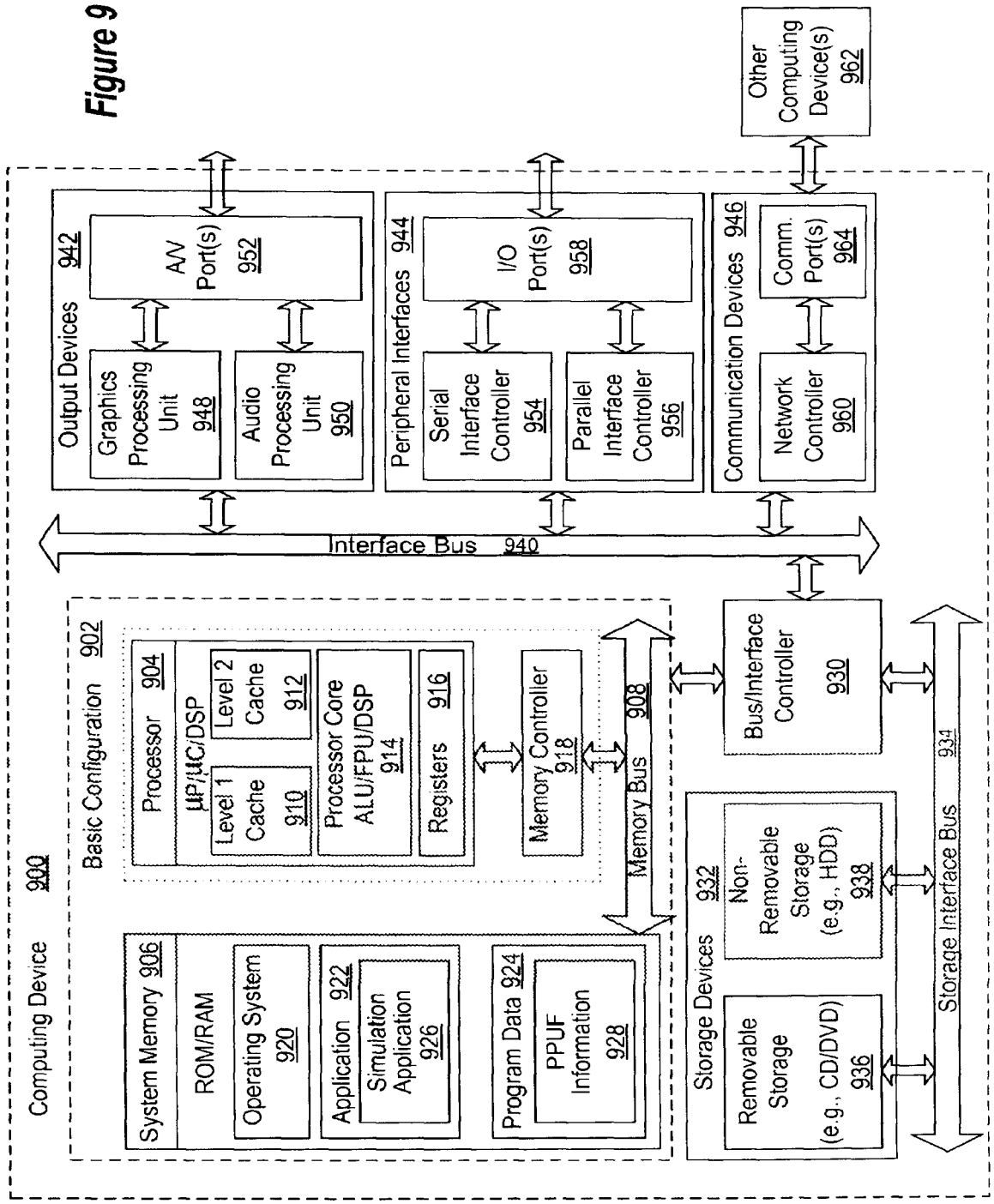

FIG. 2 shows a diagram of an illustrative embodiment of a PPUF. A PPUF 200 can be used, by way of example only, in cryptographic applications including public key cryptography. In this example, the PPUF 200 includes a circuit 210. The circuit 210 may include different types of circuit elements and may be an integrated circuit. The circuit 210 includes, in one example, a plurality of logic gates, including XOR gates and/or XNOR gates. The circuit 210 may include, multiple PUFs such as the PUF 100.

The logic gates in the circuit 210 or in each of the individual PUFs may be arranged in an array of size w×h. The size of the array can depend on determining a balance between a targeted level of security and the cost, speed, and energy consumption of the circuit 210. The width of the array (w) can be as small as one thousand gates and as large as many millions of gates. The width may be, for example between one-hundred thousand gates and one million gates. The height can be between ten rows of gates and one thousand rows of gates.

In other words, there is no conceptual limit on the size of the array. The choice of the size of the array, as previously mentioned, can be dependent on the targeted level of security and cost of operation. As a result, one of skill in the art, with the benefit of the present disclosure, can appreciate that the dimensions can be inside or outside of the ranges identified herein. However, small dimensions provide lesser security because there are fewer gates to simulate. By selecting larger dimensions, the cost of simulation becomes very large while the time required to search the actual PPUF remains small.

In some instances, all of the logic gates in the circuit 210 are identical, although embodiments contemplate instances where the logic gates in the circuit 210 include one or more types of logic gates. Further, the logic gates in the circuit 210 may each have one or more inputs (e.g., 2 inputs, 3 inputs, or more inputs). In one embodiment, the logic gates are configured such that each gate has an equal number of 0's and 1's on the gate's output. This keeps the probability of each ½ for each output, uniformly dividing the output of the PPUF 200 through the number space.

Embodiments also contemplate that the circuit 210 may be configured to provide stability to the PPUF 200. For example, temperature may significantly increase the delay of some or all of the gates in the circuit 210. Supply voltage can also have an impact on the operation of the PPUF 200. In addition, the surrounding environment and operation conditions may alter the nominal manifestation parameters of each gate, sometimes even in different ways for different gates. The gate-level characterization of the PPUF 200 may account for these factors.

To improve the stability of the PPUF 200, synthetic and operational approaches can be applied. For instance, when the circuit 210 includes circuitry such as the gates 122, the gates 122 can be placed or located as close together as possible. Also the gates 122 can be supplied by the same part of the power/ground networks so that the differential impact of manufacturing variability is minimized. Delay paths that may include inverters and multiplexers that can be rapidly characterized may also be interleaved with the circuit 210 (e.g., with the gates 122).

In FIG. 2, an input 202 is provided to the PPUF 200 to generate an output 204. Because of delay variabilities, the gates in the circuit 210 transition multiple times before reaching steady state. Clocking the output 204 at a particular time, generally before steady state is achieved, can be used in cryptographic applications.

Figure 3:
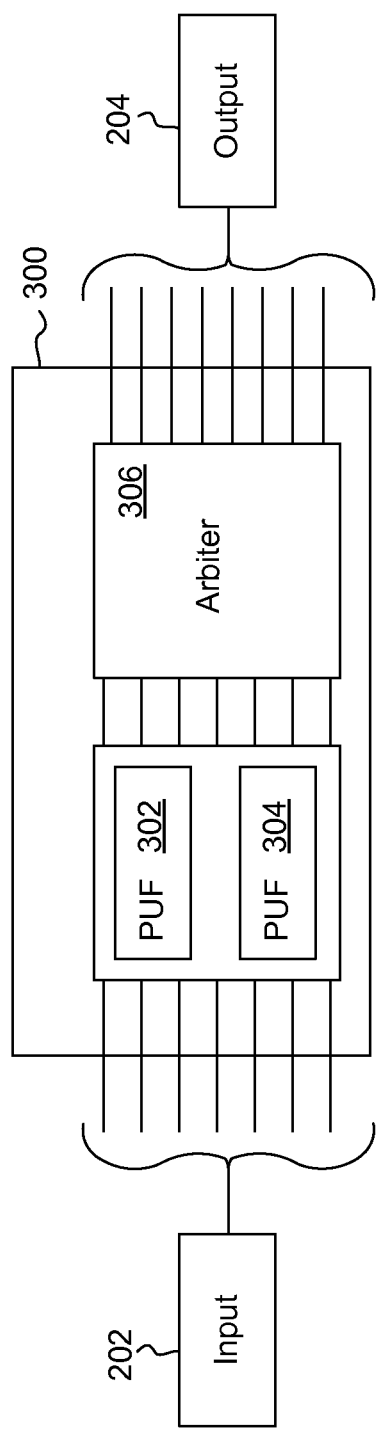
FIG. 3 shows a diagram of an illustrative embodiment of a PPUF that includes multiple PUFs.

FIG. 3 shows a diagram of an illustrative embodiment of a PPUF that includes multiple PUFs. A PPUF 300 is an example of the PPUF 200 and includes, in this example a physically uncloneable circuit or PUF 302, a physically uncloneable circuit or PUF 304, and an arbiter 306. The PUFs 302 and 304 and the arbiter 306 are an example of the circuit 210. The PUFs 302 and 304 may include logic gates, such as the gates 122 by way of example only. In some examples, the PUF 302 may have the same structure and/or function as the PUF 304. For example, the PUF 302 may be logically configured as AB+AC+AD while the PUF 304 may be configured as A(B+C+D). In this case, AB+AC+AD=A(B+C+D), but the underlying structure may be different. In other examples, the functions and configurations of the gates in the PUFs 302 and 304 can be different.

The PUFs 302 and 304 are configured to have an identical function and/or structure in this example. In other words, the circuitry of the PUF 302 is identical to the circuitry of the PUF 304. However, due to manufacturing variability, there are physical and/or chemical differences between the PUF 302 and the PUF 304. As a result, the operating characteristics of the PUF 302 may be different from the operating characteristics of the PUF 304. For example, some of the circuitry of the PUF 302 may have a delay or other characteristic that is different from the delay or other characteristic of the corresponding circuitry of the PUF 304.

For example, a number of unavoidable physical and chemical phenomena, such as silicon lattice imperfections, uneven distribution of dopants, imperfect mask alignment, or non-uniform chemical mechanical polishing, result in gates with different characteristics. The delay of the same gate in different integrated circuits can differ by about ⅓ from the nominal value and the leakage power can differ by a factor of, for instance 20. In 1 micron technology, each transistor may have on the order of a million dopants. In 45 nanometer technology, the number of dopants is only a few hundred. As a result, small variations can have a significant impact on the operating characteristics (e.g., delay) of the gate. In some embodiments, the manufacturing variability can be increased by exposition to strong light.

As a result of manufacturing variability, the PUF 302 has different operating characteristics than the PUF 304, even though the circuitry itself is identical. The difference in operating characteristics has an impact on the output of the PUFs 302 and 304.

In this example, the input 202 is applied to both the PUF 302 and 304. In other words, the PUF 302 and 304 receive the same input. The input 202 (which may include, for example, a large number of bits) may be configured such that each of the PUFs 302 and 304 receives the input 202 at the same time or at substantially the same time. This can be achieved, for example, by tying the corresponding inputs to the PUFs 302 and 304 together.

Because of the different operating characteristics, the outputs of the PUF 302 and 304 are different at different times. In this example, the outputs of the PUFs 302 and 304 are provided to the arbiter 306. The arbiter 306, in one example, compares outputs of the PUF 302 with corresponding outputs of the PUF 304. The value output by the arbiter 306 for those outputs is a 1 when the output of the PUF 302 arrives at the arbiter 306 before the output of the PUF 304. The value of the output 204 by the arbiter 306 is a 0 when the output of the PUF 304 arrives at the arbiter 306 before the output of the PUF 302. A flip flop, for example, can be used to compare corresponding outputs of the PUFs 302 and 304. The output 204 of the arbiter 306 becomes the output of the PPUF 300 More specifically, the output 204 can be determined by clocking the output of the arbiter 306 at a specific time.

Figure 4:
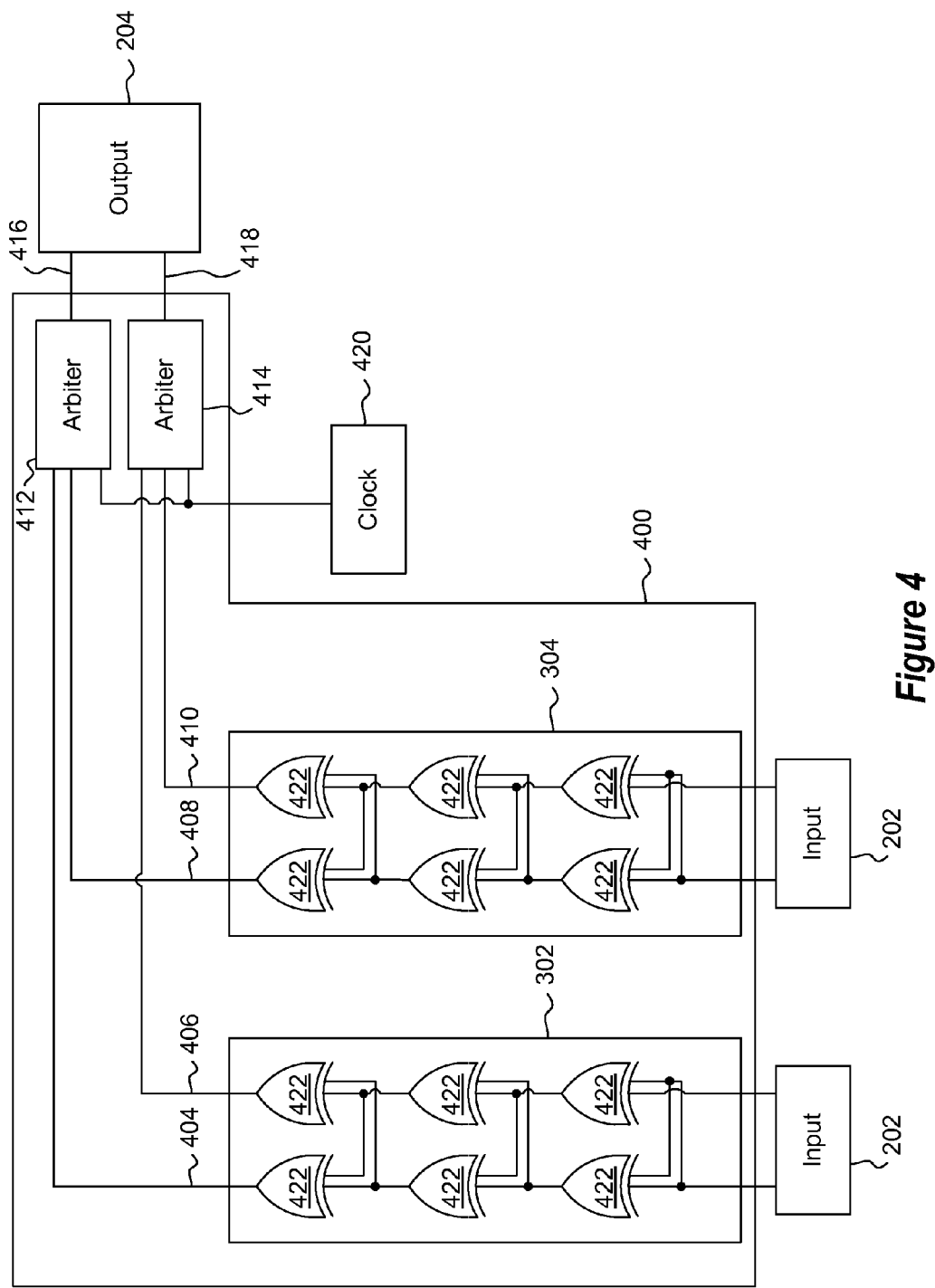
FIG. 4 shows a diagram of an illustrative embodiment of a PPUF where the circuitry includes logic gates.

FIG. 4 shows a diagram of an illustrative embodiment of a PPUF where the circuitry includes logic gates. FIG. 4 illustrates a PPUF 400, which is another example of the PPUF 200. The PPUF 400 includes the PUF 302 and the PUF 304. As shown in FIG. 4, the PUF 302 includes logic gates 422. An identical configuration of the gates 422 is included in the PUF 304.

In this example, the gates 422 in each of the PUFs 302 and 304 are illustratively arranged in an array of gates 422 of dimension w×h, which is 2×3 in FIG. 4. As previously described however, the dimensions w×h can be larger. In fact, the large dimension of the array of gates 422 has an impact on the cost of simulating the PPUF 400. As the dimensions of the array of gates 422 increases, the security increases because of an exponential increase in the cost of simulation.

After the input 202 is applied to both the PUF 302 and 304, the gates 422 transition multiple times based on when the various inputs arrive at the various inputs to the gates 422. The PUF 302 generates outputs 404 and 406 while the PUF 304 generates outputs 408 and 410. The outputs 404, 406, 408, and 410 and/or the output 204 can be determined by simulating the PPUF 400, for example, according to the delay(s) associated with the gates 422 as previously described.

Arbiters 412 and 414, which are an example of the arbiter 306 are provided and connected to the outputs of the PUFs 302 and 304. In this example, the output 404 is received by the arbiter 412. The corresponding output 408 of the PUF 304 is also received by the arbiter 412. Similarly, the output 406 of the PUF 302 and the corresponding output 410 of the PUF 304 are received by the arbiter 414. The output 204 of the PPUF 400 is the output of the arbiters 412 and 414 (i.e., an output 416 of the arbiter 412 and an output 418 of the arbiter 418).

As previously stated, the value of the output 416 of the arbiter 412 depends on which of the outputs 404 and 408 arrives first. The output 418 of the arbiter 414 similarly depends on which of the outputs 406 and 410 arrives first.

The architecture of the PPUF 400 exploits the exponential growth in the number of output transitions at the gates included in the PUFs 302 and 304 to increase the cost of simulation of the PPUF 400. Because timing considerations are paramount, then the architecture of the PPUF 400 can reduce timing considerations.

In FIG. 4, the arbiters 412 and 414 generate the outputs 416 and 418 according to timing. The output 204 of the PPUF 400 relates to how the outputs of the PUFs 302 and 304 arrive at the arbiters 412 and 414.

The output 204 can be clocked accurately with a clock 420 in part because the timing of the earliest transition is determined by the shortest path through to the output. The length of this path varies roughly with the sum of the variability of gates along the path. As the PUFs 302 and 304 get deeper, the time window between the earliest paths of the PUFs 302 and 304 increases. The number of paths to the output is one factor that determines the simulation cost of the PPUF 400.

More specifically, the arbiters 412 and 414 can be clocked at some time in order to determine the output 204 of the PPUF 400 at a certain time. By using the arbiters 412 and 414, the output 204 of the PPUF 400 can be determined without relying on precise timing measurements.

For example, determining the output of a single PUF requires relatively precise clocking and timing. More specifically, the fast operation of the PUF, combined with the number of output transitions, results in an increased number of output transitions. In this case, the mean time between output transitions becomes extremely small. As a result, the ability to determine the output of the single PUF at a specific time requires relatively precise timing.

The arbiters 412 and 414 eliminate this concern by using the earliest output transition as the output of the PPUF 400. This is easier to clock accurately because the timing of the earliest transition is determined by the shortest path through the PUFs 302 and 304 to the arbiters 412 and 414. In one example, as the circuit gets deeper and has more gates, a time window between the earliest paths of the PUFs 302 and 304 increases as previously described. As a result, determining the output of the PPUF 400 becomes easier and does not sacrifice the efficacy of the PPUF 400 when used in cryptographic applications.

Figure 5:
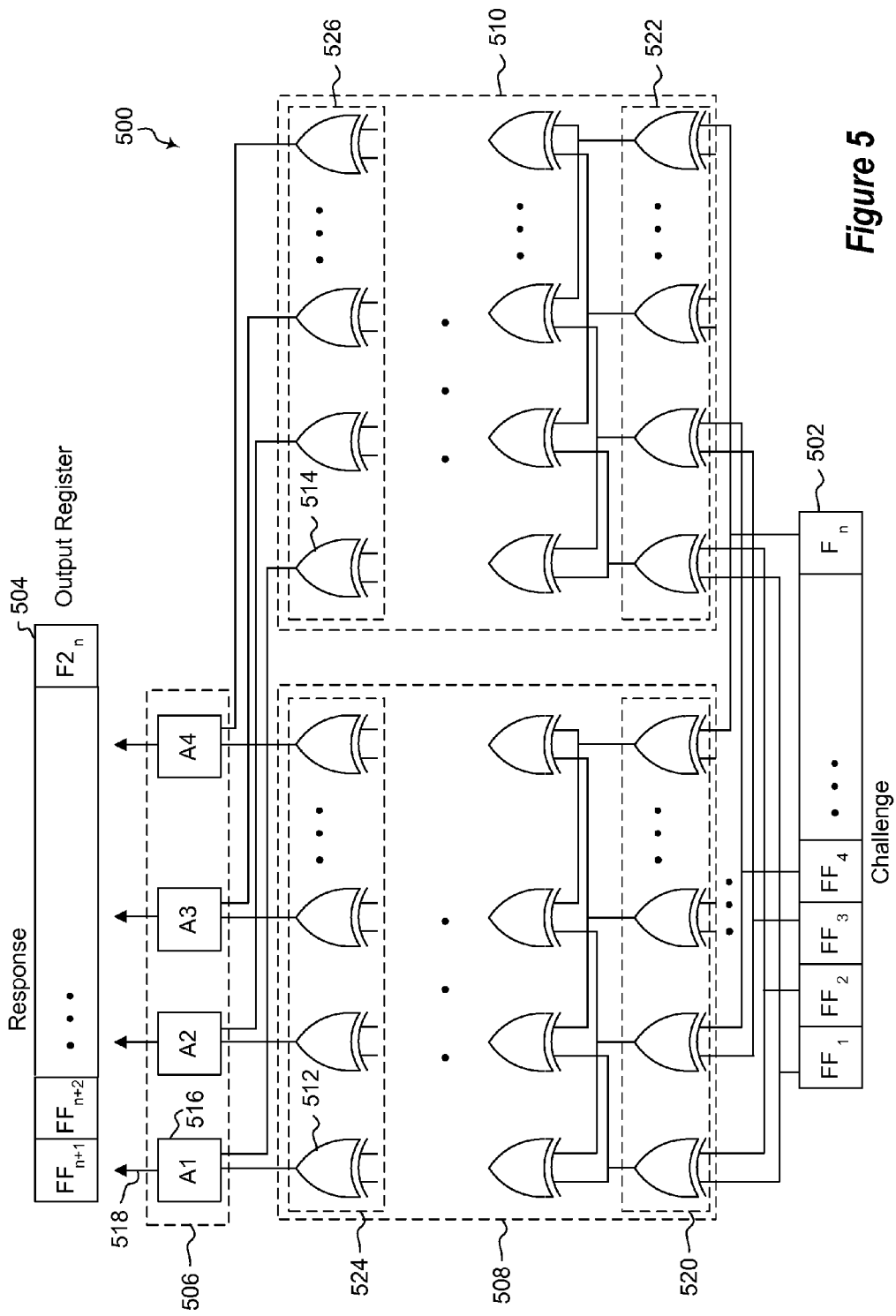
FIG. 5 shows a diagram of an illustrative embodiment of a PPUF that uses multiple PUFs and an arbiter to determine an output of the PPUF.

FIG. 5 shows a diagram of an illustrative embodiment of a PPUF that uses multiple PUFs and an arbiter to determine an output of the PPUF. A PPUF 500, which may be an embodiment of the PPUF 200, includes a PUF 508 and a PUF 510. The PUFs 508 and 510 include a multiple number of gates (e.g., XOR gates, XNOR gates) that are arranged in an array of size w rows by h columns (w×h). An input 502 is fed into a bottom row 520 of the PUF 508 and a bottom row 522 of the PUF 510, and the output of the PUFs 508 and 510 are read or received from the a top row 524 of the PUF 508 and a top row 526 of the PUF 510. Each intermediate row of gates in the PUFs 508 and 510 feeds the next row, with each gate having b inputs from the previous row. The number of inputs b can impact the number of paths in the PPUF 500. A larger b may result in a more secure, but slower, PPUF. In one example, b may be between 2 and 8, including 2 and 8. Although a larger number of inputs b can result in a more secure, but slower, PPUF, a larger b also increases the simulation time. As a result, a larger b can also allow for the use of a smaller PPUF, which reduces the operation time of the PPUF. One of skill in the art, with the benefit of the present disclosure, can select another value for b.

The input 502 may be stored in a register and can be applied to each of the PUFs 508 and 510 at the same time or at substantially the same time.

In one example, the input 502 can be provided to the PPUF 500 using flip flops ($FF_{1-n}$). FIG. 5 provides an example where the output of each flip flop is provides to one input of one gate in each of the PUF 508 and 510. The outputs of the gates in the row 520 are provided to two gates. The outputs of the gates in the row 522 are similarly connected. The input 502, however, can be connected in any way, including random. In addition, the connections between the rows of gates can also be connected in different ways. In one example, each flip flop and each gate drives to the same number of gates so that the nominal configuration has an identical delay on any path from any input to any output.

The output 504 can also be implemented using flip flops ($FF_{(n+1)-2n}$).

Arbiters 506 are connected to the PUFs 508 and 510 as previously described. Corresponding outputs of the PUFs 508 and 510 are connected to an arbiter. For example, the outputs of a gate 512 and of a gate 514 are connected to an arbiter 516. An output 518 of the arbiter 516 depends on which output arrives first at the arbiter 516. As previously described, the output of the gate 512 may arrive first if its path in the PUF 508 is shorter than the path of the output of the gate 514. In this sense, the PUF 508 triggers first at least for the output of the gate 512. The outputs of the gates in row w are similarly connected to other arbiters in the arbiters 506. The outputs of the arbiters 506, when clocked, can be stored in a register 504 as the output of the PPUF 500.

As previously described, the PPUF is a physical system that is uncloneable due to its structural complexity, yet whose simulation is feasible, although requiring a large amount of time to do so. Due to manufacturing variability, the delay through each gate in the PUFs 508 and 510 will likely vary by a significant percentage from its neighbors. Furthermore, because of the transistor-level construction of gates, the delay through any given gate for each of its inputs will differ. As a result, there may be many transitions on the output of the PUFs 508 and 510 before the circuitry reaches steady state.

In order to operate the PPUF 500, three values may be provided in an embodiment: $x_0$, the previous input; $x_1$, the input; and t, the output time. The PPUF 500 has reached steady state with input $x_0$ before $x_1$ arrives. The input to the circuit is $x_1$, and the PPUF 500 is clocked at time t to read the output from the output 504, which may be a register. This is the final output of the PPUF 500.

The PPUF 500 is a physically uncloneable function because the output 504 is dependent on manufacturing variability in the delay of the gates in the PUFs 508 and 510. The manufacturing variability is inherently unfeasible to replicate with the same manufacturing technology. The PPUF 500 can be public, however, because given the delay of each gate, the output 504 can be simulated. In other words, a gate-level characterization of the PPUF 500 can be made public and serve, for example, as a public key in cryptographical applications. In some embodiments, the gate level characterization of the PPUF 500 may also include a characterization of the arbiters 506 in addition to the characterizations of the PUFs 508 and 510

Figure 6:
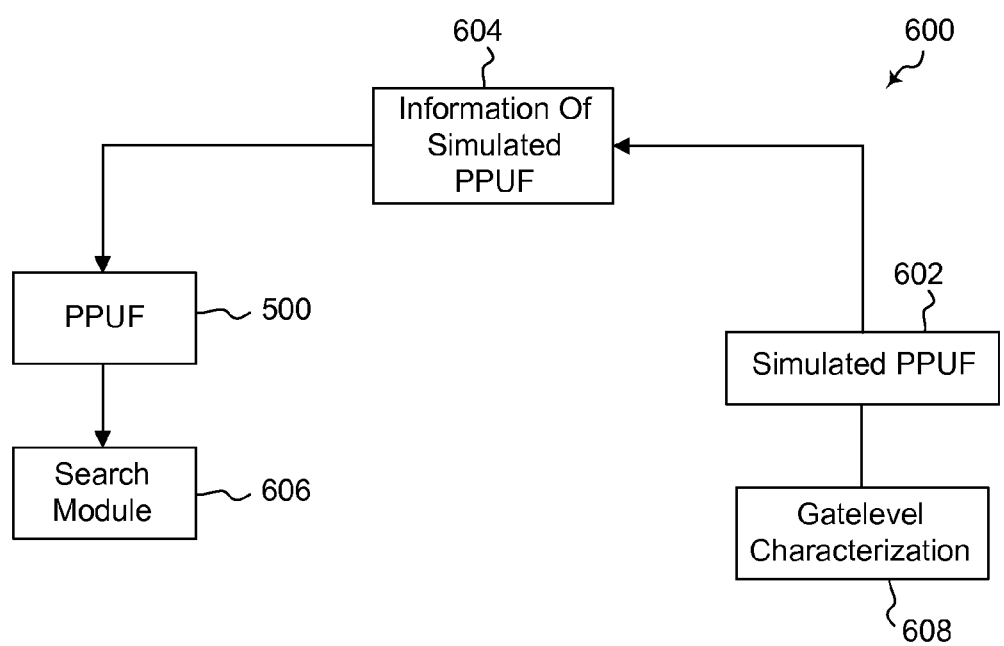
FIG. 6 shows a block diagram showing an illustrative embodiment of the communication of a secret key using a PPUF and a simulated PPUF.

FIG. 6 shows a block diagram showing an illustrative embodiment of the communication of a secret key using a PPUF and a simulated PPUF. The communication of the secret key (or other private information or data) can occur in an environment 600. The environment 600 may be, by way of example only, secure email, secure remote access (e.g., passwords and smart cards), remote gambling, digital signatures, privacy protection, digital rights management, watermarking fingerprinting, or the like or any combination thereof. The environment 600 may include a couple of devices that are involved in or participating in an application involving cryptography.

FIG. 6 illustrates the PPUF 500 and a simulated PPUF 602. The simulated PPUF 602 may use a gate-level characterization 608 of the PPUF 500. The gate-level characterization 608 may be a public description of the PPUF 500.

As a result, the PPUF 500 can be simulated using the gate-level characterization 608 of the simulated PPUF 602. The gate-level characterization 608 of the PPUF 500 provides sufficient information (e.g., information regarding delays at each of the gates in each of the PUFs 508 and 510 and/or information describing the arbiter 506) to simulate the output of the PPUF 500 without actually possessing the PPUF 500.

The simulated PPUF 602 enables two parties, A and B, to exchange a secret key (or other data). The key may be used to encrypt/decrypt data, for instance. In another example, A and B represent devices that are involved in an application using cryptography. For example, A and B could be two devices performing a challenge/response, authentication, data encryption, and the like or any combination thereof. In this example, B is the simulating party (or device) that uses the simulated PPUF 602 to simulate the output of the PPUF 500 for some input.

Generally, B selects some number, x, from a range of numbers of size n. B then simulates the output of the PPUF 500 on input x using the simulated PPUF 602. B then sends information 604 related to the simulation of the PPUF 500 to A. The information, as previously described, generally includes an output of the simulation, y, and the time, t, at which the output was determined. As previously described, A searches for the input with a search module 606 that uses the PPUF 500 to determine the input x selected by B.

The following description provides an illustrative example of a protocol for exchanging data (e.g., a secret key or other private data or information).

The protocol for exchanging secret key using a PPUF such as the PPUF 200 between B and A can be as follows:

1. B simulates values.
   (a) B randomly selects $x_0$ from $0 \ldots 2^w$, where w is input width of the PPUF.
   (b) B selects $x_1 \ldots x_m$ from $x_0 \ldots x_0+n$, where n is computed as described below.
   (c) B applies a hashing function, f, to compute $Z_1=f(x_1) \ldots Z_m=f(x_m)$.
   (d) B simulates $Z_1 \ldots Z_m$ on the simulated PUF of A's PPUF, starting with $x_0$ as the initial input, and timing at $t_1 \ldots t_m$. This produces outputs $y_1 \ldots y_m$ that correspond to timing $t_1 \ldots t_m$.
2. B sends $x_0$, m, n, $y_1 \ldots y_m$, and $t_1 \ldots t_m$ to A.
3. A finds $x_1 \ldots x_m$.
   (a) A iterates over each x ($x_0$, $x_0+n$).
   (b) A computes $z=f(x)$.
   (c) A runs the PPUF with $x_0$ as the steady-state input, z as the input, and clocking at each $t_1 \ldots t_m$.
   (d) If the output at time $t_1$ equals $y_1$, then store x as $x_1$.
   (e) Halt when all $x_1 \ldots x_m$ are found.
4. A and B concatenate $z_1 \ldots z_m$ to form the secret key.

One advantage of this protocol is that an attacker does not know which values have been selected, nor does the attacker have A's PPUF (the actual PPUF) to enable fast searching. The attacker must search the $x_0 \ldots x_0+n$ values, simulating each, to find each $x_1$. Even with fairly small m, the attacker will have to search the majority of the n numbers. Thus, the attacker's disadvantage over B is roughly n, and the attacker's disadvantage over A is approximately the cost of simulation.

More specifically, let $W_A$ be the work for the owner of the PPUF. Here, work is normalized to the cost of computing the output of the PPUF. Similarly, $W_B$ is the work for the simulating party, and $W_O$ is the work for an observer (attacker). If $W_A=W_B$, then the effective computational advantage over an attacker is the minimum of either advantage.

The owner possessor of the PPUF's work is dominated by the search for $x_1 \ldots x_m$. So $W_A$ is simply the amount of numbers that must be searched to find all $x_1$. Using simple probability.

$$W_A = \frac{m}{m+1}n.$$

Similarly, the simulating party's work is dominated by simulation and $W_B=m$. This yields: $n=(m+1)$ in one embodiment.

This example of the protocol includes the multiple values, m, and the hashing function, f. Multiple values are used in order to reduce the variance in the protocol. When a single value is sent, then the search time for A or any attacker has large variance. This is undesirable if one goal is to achieve a specific level of security or allocate a set amount of work for A. By sending more values, the expected fraction of the number space that needs to be searched is increased and the variance is significantly reduced.

A hashing function, f, is also applied to each value before sending it to the PPUF. This is because using partial simulation, the PPUF's output doesn't depend on all of its inputs. By selecting from a range $x_0 \ldots x_0+n$, many bits are shared between numbers. Therefore, the output of the PPUF might no longer be unique, greatly increasing the odds of collisions on the output. By applying a hashing function, the bits of the input will be different for each $x_1$ and therefore the output of the PPUF will be unique (with extraordinarily high probability). There are numerous ways of achieving the same effect—for example, defining $x_1=f_i(x_0)$, or having the output of $x_i-1$ be the steady-state input for $x_i$.

One way this protocol could be attacked is to pre-compute the output of the PPUF for every possible input. However, this can be prevented by choosing the secret key, x, to be a long number, say 1024 bits. This would require $2^{1024}$ bits of storage, which is not feasible for any potential attacker.

As mentioned previously, partial simulation can be useful when the cost of simulation is reduced without having a proportional reduction in the simulation time of an attacker. In one instance, a single output gate of the PPUF is computed instead of the complete output. This can include computing a large fraction of the previous rows, but saves on simulation cost since the simulation cost increases exponentially with the height of the circuit. In addition to the output of the single output gate, the output of one or more previous rows feeding the final output are included in order to distinguish among the inputs. These outputs of previous rows can be mapped using a hash function so that their inclusion does not provide third parties with any addition information or enable the third parties to shorten the simulation that is otherwise required.

Figure 7:
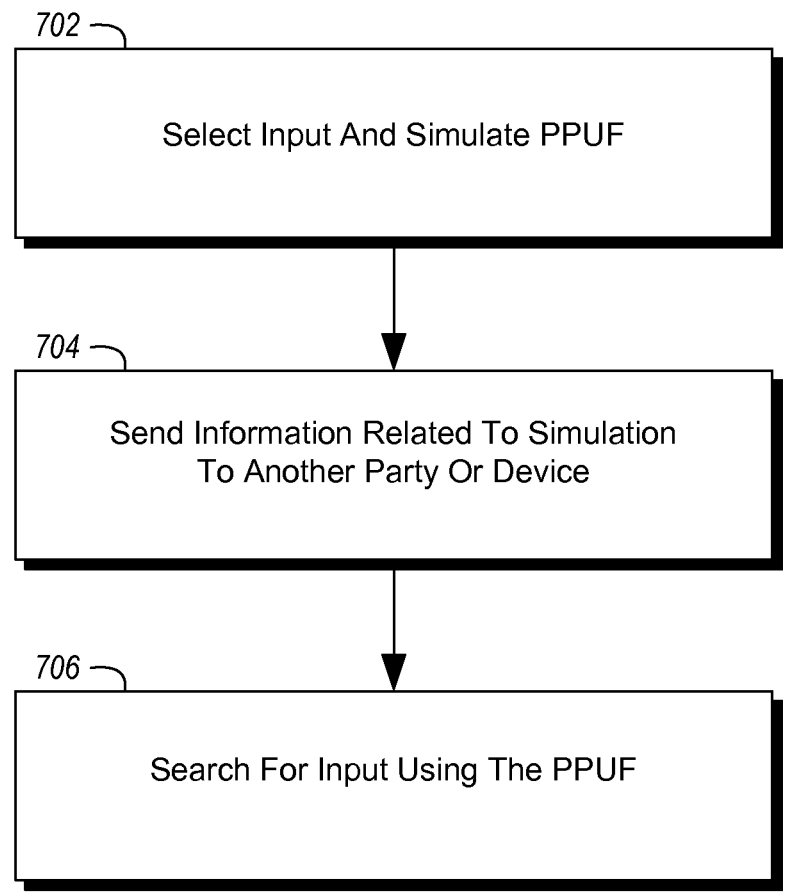
FIG. 7 is a flow diagram of an illustrative embodiment of a method for performing cryptography using a PPUF.

FIG. 7 is a flow diagram of an illustrative embodiment of a method for performing cryptography using a PPUF. In block 702, an input to a simulated PPUF, which may be a public description of the PPUF, is selected and the PPUF is simulated on the selected input. The input can be a single number or multiple numbers selected from a range of numbers. The range of numbers may be determined according to a configuration of the PPUF. For example, the PPUF may have w inputs. As a result, the range of numbers may be $2^w$. The selected input(s) is then simulated on the simulated PPUF. Simulating the PPUF with the selected input results in an output. In one embodiment, the input may include a range of numbers that are simulated sequentially.

In block 704, information related to the simulation performed in block 702 is sent to another entity or device. The information often includes the output of the simulation, a time at which the output is identified, and/or other information as previously described. In block 706, the information is used to search for the input initially selected. The search is performed using the actual PPUF such that the time required to search is quite short.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The advantage that can be practically gained may be very large. For example, due to inherent parallelism in the simulation and the availability of multicore processors, one advantage is that the simulating party should have roughly 10 GHz, or $10^{10}$ cycles per second of computational power.

For example, if 3 numbers (m=3) are simulated and the simulating party takes $10^3$ seconds (fifteen minutes) to simulate, then this gives the simulating party roughly $3 \times 10^{12}$ cycles of simulation per number. Assuming a PPUF with $w=10^4$ (a much larger number can be achieved with modern silicon manufacturing technology), the simulation cost is approximately $1.7 \times 10^{16}$ cycles. The owner of the PPUF should search $n \approx 10^{13}$ numbers. The attacker, however, is likely to perform $1.7 \times 10^{29}$ cycles of simulation on average to find the secret key. In effect, an attacker could take more than 500 years to break this protocol. Additional examples of the cost of simulation are described in "Hardware-Based Public-Key Cryptography with Public Physically Unclonable Functions" Nathan Beckmann and Miodrag Potkonjak, Lecture Notes in Computer Science: Information Hiding, Sep. 3, 2009, pp 206-220, Volume 5806/2009, Springer, Berlin/Heidelberg, which is incorporated herein by reference in its entirety.

Figure 8:
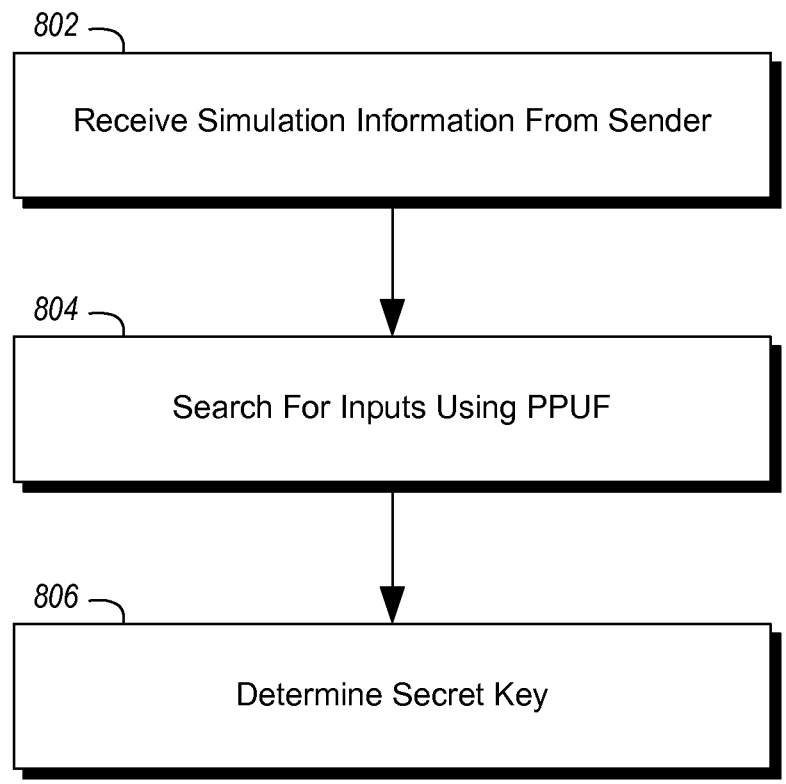
FIG. 8 is a flow diagram of an illustrative embodiment of a method for transferring a secret key.

FIG. 8 is a flow diagram of an illustrative embodiment of a method for transferring a secret key. In block 802, a device or entity receives simulation information from a sender, which may be another party or another device. As previously described, the simulation information includes data related to a simulation of a PPUF. The information can include the output(s) of the simulation, timing information (timing at which the outputs where determined), the number of inputs simulated, or the like. The inputs that were simulated can be selected by a user, by a device, or even randomly.

In block 804, the receiving device searches for the inputs that were selected for simulation. The search takes comparably less time because the search can be performed using the physical PPUF. As previously stated, arbiters can be used to minimize timing issues when determining the output of the PPUF at certain times.

In block 806, the receiving device determines a secret key from the inputs that were searched. In one example, the inputs, once found by searching the range of inputs, are concatenated to form the secret key.

PPUFs and the PPUF-based cryptographic approaches disclosed herein, including for the remote exchange of secret keys, have a number of properties that enable their ready application, by way of example only, to a number of security, digital rights management (DRM), and cryptographical tasks. Representative application protocols for tasks include, but are not limited to, public key cryptography, digital signatures, and authentication (zero-knowledge one-time passwords).

The common objectives for these protocols include, by way of example only, the following: (i) Low information leakage; (ii) High resiliency against physical and side channel attacks; (iii) Low cost and power overheads; and (iv) Ultra-high speed. These objective ensure that the attacker generally learns exponentially small information about the input/output (IO) mapping. In addition, a few hundred gates with local routing are sufficient for all the protocols, and in many situations a single clock cycle is sufficient. For almost all protocols, a combinational delay through less than a few tens of gates in a single clock cycle is sufficient for one side.

Embodiments also relate to security paradigms that can be used for the generation of security systems and protocols. One security paradigm is a PPUF challenge. In this example, one of the sides issues a challenge that is easily computable if the other side has the PPUF. Otherwise, it is very time consuming to compute the challenge using simulation, but some of its randomly selected outputs can be easily verified.

Another security paradigm is PPUF matching. In this example, one side specifies a large set of potential input vectors. One (or a few) of the output vectors has a publicly announced property that is used for recovery of the input vector that contains secure and secret information. This approach places higher demand on the owner of the PPUF, but achieves higher security.

Authentication can also be implemented with PPUFs. Authentication can be defined as a process of establishing proof that a particular artifact or person or device is indeed whom it purports to be. PPUFs provide a direct and exceptionally strong solution to authentication problems such as passwords, smartcard, cell phone SIM modules and RFID labels. By limiting the acceptable time for responses to a randomly generated challenge, one can easily guarantee that no entity can launch a feasible attack. For example, if the output vector that is (partly) pre-computed and answers are only accepted when received in the next few nanoseconds, the PPUF will readily produce it. Any attacker will therefore not have time to send the challenge for processing.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Figure 9:
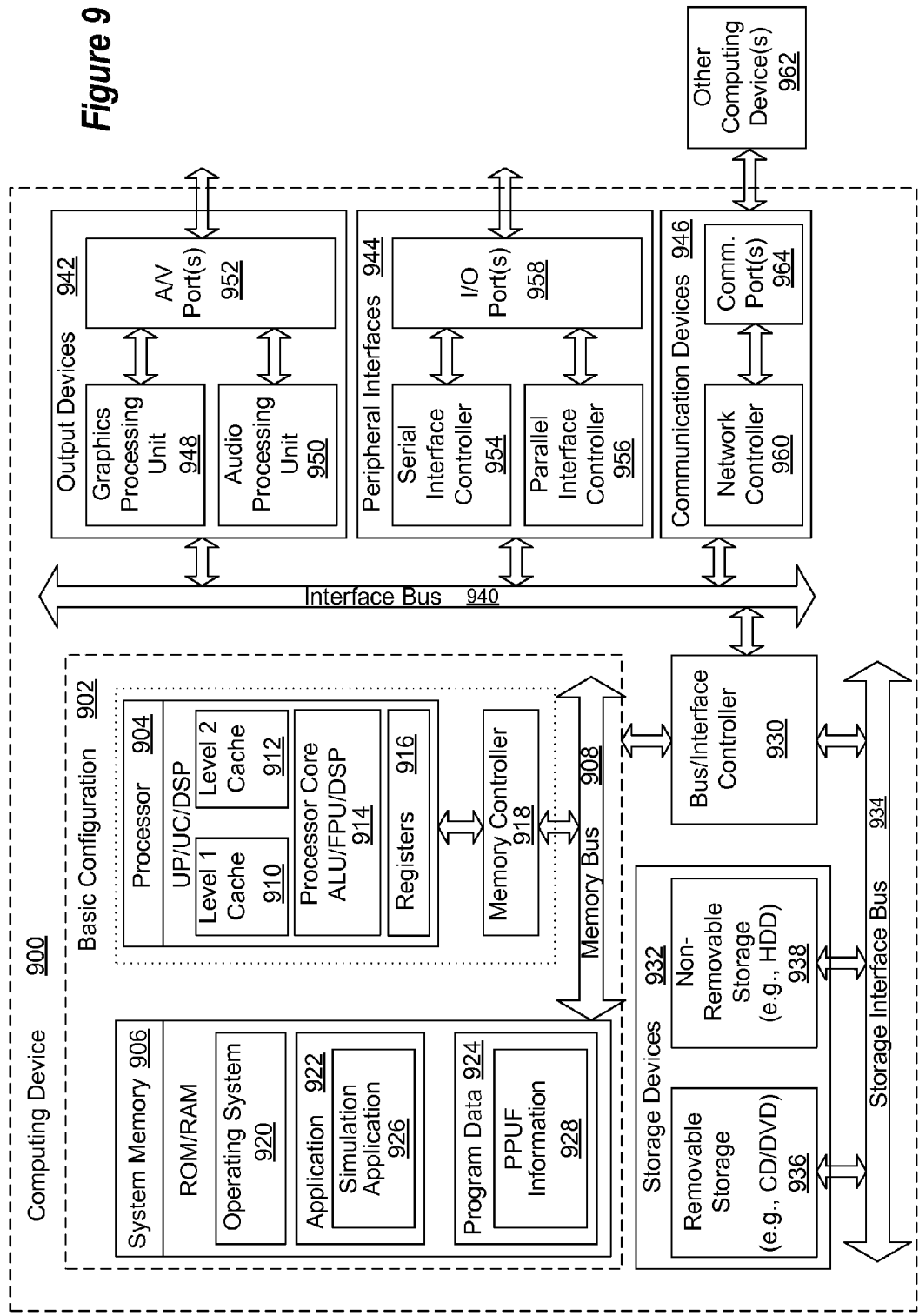
FIG. 9 shows an example computing device that is arranged for cryptography applications or for performing applications that may include cryptographical uses in accordance with the present disclosure.

FIG. 9 shows an example computing device 900 that is arranged for performing cryptography applications or for performing applications that may include cryptographical uses in accordance with the present disclosure. In a very basic configuration 902, computing device 900 generally includes one or more processors 904 and a system memory 906. A memory bus 908 may be used for communicating between processor 904 and system memory 906.

Depending on the desired configuration, processor 904 may be of any type including but not limited to a microprocessor (µP), a microcontroller (µC), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include a simulating application 926 that is arranged to simulate a PPUF or that is arranged to search for inputs using a PPUF. Program Data 924 may include PPUF information 928 (e.g., a gate-level characterization of the PPUF) that may be useful for simulating the PPUF on a selected input or for the PPUF information may also include the output of the simulation and associated timing that may be useful for searching the actual PPUF. In some embodiments, application 922 may be arranged to operate with program data 924 on operating system 920 such that a PPUF can be searched or such that the PPUF can be simulated using the PUF information as described herein. This described basic configuration 902 is illustrated in FIG. 9 by those components within the inner dashed line.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

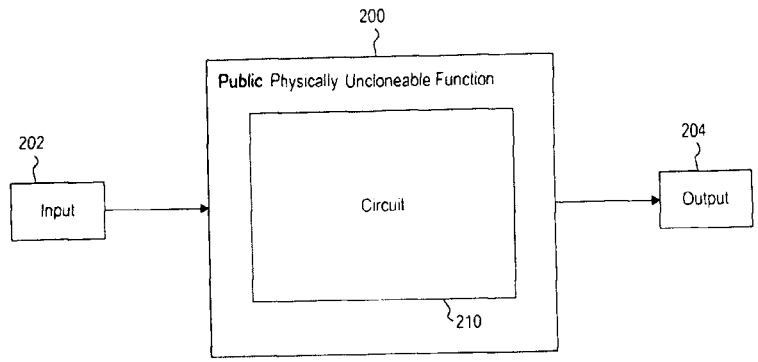

What is claimed is:

1. An integrated circuit, comprising:
a physically uncloneable circuit having at least one first output;
a second physically uncloneable circuit having at least one second output; and
at least one arbiter configured to receive the first output and the second output and to generate an arbiter output based on the first output and the second output, the arbiter output being clocked before both the first physically uncloneable circuit and the second physically uncloneable circuit reach steady state, the clocked arbiter output being a circuit output of the integrated circuit.

2. The integrated circuit of claim 1, wherein the first physically uncloneable circuit includes first delay characteristics and the second physically uncloneable function includes second delay characteristics different from the first delay characteristics.

3. The integrated circuit of claim 2, wherein the first and second physically uncloneable circuits have at least one of an identical function and an identical structure.

4. The integrated circuit of claim 1, wherein the clocked arbiter output is the first output when the first output arrives at the at least one arbiter before the second output.

5. The integrated circuit of claim 1, wherein each of the first physically uncloneable circuit and the second physically uncloneable circuit comprises logical gates.

6. The integrated circuit of claim 5, wherein the logical gates include at least one of XOR gates and XNOR gates.

7. The integrated circuit of claim 5, wherein the logical gates are arranged in an array.

8. The integrated circuit of claim 1, wherein the at least one arbiter comprises a flip flop, wherein the flip flop is coupled to the first output and the second output.

9. The integrated circuit of claim 1, wherein the clocked arbiter output is stored and used as the circuit output of the integrated circuit.

10. A method for determining an output of a public physically uncloneable function, comprising:
providing a first input to a plurality of physically uncloneable circuits at substantially the same time;
providing an output of each of the plurality of physically uncloneable circuits to at least one arbiter, wherein the arbiter selects one of the outputs as an output of the at least one arbiter;
providing a second input to the plurality of physically uncloneable circuits, wherein the second input changes the output of the at least one arbiter; and
clocking the output of the at least one arbiter at a particular time after providing the second input and before the plurality of physically uncloneable circuits reach a steady state to determine the output of the public physically uncloneable function.

11. The method of claim 10, further comprising selecting the output of the at least one arbiter according to which of the outputs of the plurality of physically uncloneable circuits arrives first.

12. The method of claim 10, wherein providing an output of each of the plurality of physically uncloneable circuits to at least one arbiter comprises providing the outputs to a plurality of arbiters, wherein each of the first input, the second input, and the outputs includes a plurality of bits.

13. The method of claim 10, wherein the plurality of physically uncloneable circuits have at least one of an identical function and an identical structure.

14. The method of claim 10, wherein the outputs of the plurality of physically uncloneable circuits differ at the particular time.

15. The method of claim 10, further comprising determining that the plurality of physically uncloneable circuits have each reached the steady state before providing the second input.

16. The method of claim 10, wherein providing a first input to a plurality of physically uncloneable circuits comprises providing the first input to the plurality of physically uncloneable circuits, each comprising a plurality of logical gates.

17. The method of claim 10, wherein the clocked output of the at least one arbiter is stored and used as the output of the public physically uncloneable function.

18. A method for determining an output of a public physically uncloneable function, comprising:
    providing an input to a plurality of physically uncloneable circuits at substantially the same time;
    providing an output of each of the plurality of physically uncloneable circuits to at least one arbiter, wherein the at least one arbiter selects one of the outputs as an output of the at least one arbiter; and
    clocking the output of the at least one arbiter before the selected one of the outputs of the plurality of physically uncloneable circuits reaches a steady state to determine the output of the public physically uncloneable function.

19. The method of claim 18, further comprising selecting the output of the at least one arbiter according to which of the outputs of the plurality of physically uncloneable circuits arrives first.

20. The method of claim 18, wherein the plurality of physically uncloneable circuits have at least one of an identical function and an identical structure.

21. The method of claim 18, further comprising providing another input to the plurality of physically uncloneable circuits before providing the input to the plurality of physically uncloneable circuits.

22. The method of claim 18, wherein the clocked output of the at least one arbiter is stored and used as the output of the public physically uncloneable function.

* * * * *

UNITED STATES PATENT AND TRADEMARK OFFICE
CERTIFICATE OF CORRECTION

| | | |
|---|---|---|
| PATENT NO. | : 8,458,489 B2 | Page 1 of 5 |
| APPLICATION NO. | : 12/732012 | |
| DATED | : June 4, 2013 | |
| INVENTOR(S) | : Beckmann et al. | |

It is certified that error appears in the above-identified patent and that said Letters Patent is hereby corrected as shown below:

The title page showing the illustrative figure should be deleted to be replaced with the attached title page.

On the Title Page, item (56), under "OTHER PUBLICATIONS", in Column 1, Line 1, delete "al" and insert -- al., --, therefor at each occurrence throughout the Other Publications.

On the Title Page, item (56), under "OTHER PUBLICATIONS", in Column 2, Line 8, delete "al." and insert -- al., --, therefor.

On the Title Page, item (56), under "OTHER PUBLICATIONS", in Column 2, Line 20, delete "Crypotosystems"" and insert -- Cryptosystems" --, therefor.

On Title Page 2, item (56), under "OTHER PUBLICATIONS", in Column 1, Line 19, delete "billiaon"" and insert -- billion" --, therefor.

On Title Page 2, item (56), under "OTHER PUBLICATIONS", in Column 1, Line 21, delete "tiem" and insert -- time --, therefor.

On Title Page 2, item (56), under "OTHER PUBLICATIONS", in Column 1, Line 31, delete "Werlag," and insert -- Verlag, --, therefor.

On Title Page 2, item (56), under "OTHER PUBLICATIONS", in Column 1, Line 33, delete "Circuyits" and insert -- Circuits --, therefor.

On Title Page 2, item (56), under "OTHER PUBLICATIONS", in Column 1, Line 37, delete "techinques" and insert -- techniques --, therefor.

On Title Page 2, item (56), under "OTHER PUBLICATIONS", in Column 2, Line 25, delete "Circuites:" and insert -- Circuits: --, therefor.

Signed and Sealed this
Twenty-sixth Day of November, 2013

Margaret A. Focarino
*Commissioner for Patents of the United States Patent and Trademark Office*

In the drawing sheets, consisting of Figs. 2 and 9 should be deleted to be replaced with the drawing sheets, consisting of Figs. 2 and 9, as shown on the attached pages.

In the Specifications:

In Column 1, Line 39, delete "PUFS." and insert -- PUFs. --, therefor.

In Column 1, Line 46, delete "key" and insert -- key. --, therefor.

In Column 7, Line 37, delete "418)." and insert -- 414). --, therefor.

In Column 9, Line 32, delete "510" and insert -- 510. --, therefor.

In Column 10, Line 38, delete "$x_1$." and insert -- $x_i$. --, therefor.

In Column 10, Line 50, delete "$x_1$." and insert -- $x_i$. --, therefor.

In Column 11, Line 8, delete "$x_1$" and insert -- $x_i$ --, therefor.

In Column 12, Line 52, delete "objective" and insert -- objectives --, therefor.

In Column 12, Line 54, delete "(IO)" and insert -- (I/O) --, therefor.

In Column 17, Line 17, delete "(HDD)," and insert -- (HDDs), --, therefor.

In Column 17, Line 19, delete "(SSD)," and insert -- (SSDs), --, therefor.

In Column 17, Line 29, delete "(DVD)" and insert -- (DVDs) --, therefor.

In the Claims:

In Column 18, Line 16, in Claim 1, delete "physically" and insert -- first physically --, therefor.

In Column 18, Line 57, in Claim 10, delete "wherein the" and insert -- wherein the at least one --, therefor.

(12) United States Patent
Beckmann et al.

(10) Patent No.: US 8,458,489 B2
(45) Date of Patent: Jun. 4, 2013

(54) DIFFERENTIAL UNCLONEABLE VARIABILITY-BASED CRYPTOGRAPHY

(75) Inventors: Nathan Beckmann, Cambridge, MA (US); Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 389 days.

(21) Appl. No.: 12/732,012

(22) Filed: Mar. 25, 2010

(65) Prior Publication Data
US 2011/0239002 A1 Sep. 29, 2011

(51) Int. Cl.
*G06F 12/14* (2006.01)

(52) U.S. Cl.
USPC .......................................................... 713/189

(58) Field of Classification Search
None
See application file for complete search history.

(56) References Cited

U.S. PATENT DOCUMENTS

| | | | |
|---|---|---|---|
| 2003/0204743 A1* | 10/2003 | Devadas et al. | 713/200 |
| 2008/0279373 A1 | 11/2008 | Erhart et al. | |
| 2009/0083833 A1* | 3/2009 | Ziola et al. | 726/2 |

OTHER PUBLICATIONS

Ravikanth Pappu, et al "Physical One-Way Functions" Science 297, 2026-2030 (2002) [Online: http://www.sciencemag.org/cgi/content/full/297/5589/2026].
Alfred J. Menezes, et al "Handbook of Applied Cryptography" CRC Press, ISBN: 0-8493-8523-7, 5th Printing Aug. 2001, Chapter 1 (pp. 1-48) and Chapter 12 (pp. 489-541) [Online: http://www.cacr.math.uwaterloo.ca/hac/].
Bernstein, K. et al., "High-Performance cmos variability in the 65—nm regime and beyond," IBM Journal of Research and Development, vol. 50 No. 4/5, pp. 433-449, Jul./Sep. 2006.
Corkum, P. and Krausz, F., "Attosecond Science," Nature Physics, 3 (6), pp. 381-387, 2007.
Roy, S. and Asenov, A., "Where do the dopants go?" Science, vol. 309 No. 5733, pp. 388-390, Jul. 15, 2005.
John D. Joannapoulou et al. "Photonic Crystals: Molding the Flow of Light," Princeton University Press, 2nd Edition, 2008, pp. 252-264.
Kleinberg, J. and Tardos, E., "Algorithm Design," pp. 1-8, Addison-Wesley Longman Publishing Co., Inc., 2005.
Goldreich, O., "Foundations of Cryptography," vol. 1, Cambridge University Press, 2001, pp. 1-3.
Verayo, "Vera X512H unclonable RFID IC" [Online: http://www.verayo.com].
A. Baltuska, et al "Attosecond control of electronic processes by intense light fields" Letter to Nature, vol. 42, Feb. 6, 2003, pp. 611-615.
Eli Biham, et al "Differential Cryptanalysis of DES-like Crypotosystems" Journal of Cryptology, 4(1).3-72, 1991.
Yugun Chen, et al "Certifying Authenticity via Fiber-Infused Paper" ACM SIGecom Exchanges, 5(3):29-37, 2005.

(Continued)

*Primary Examiner* — Cordelia Zecher
(74) *Attorney, Agent, or Firm* — Maschoff Brennan

(57) ABSTRACT

Differential uncloneable variability-based cryptography techniques are provided. The differential cryptography includes a hardware based public physically uncloneable function (PPUF) to perform the cryptography. The PPUF includes a first physically uncloneable function (PUF) and a second physically uncloneable function. An arbiter determines the output of the circuit using the outputs of the first and second PUFs. Cryptography can be performed by simulating the PPUF with selected input. The output of the simulation, along with timing information about a set of inputs from where the corresponding input is randomly selected for simulation, is used by the communicating party that has the integrated circuit with the PPUF to search for an input that produces the output. The input can be configured to be the secret key or a part of the secret key.

22 Claims, 9 Drawing Sheets